Jan. 12, 1932.  H. O. LOEBELL  1,840,403
MANUFACTURE OF COMBUSTIBLE GAS AND CARBONIZED FUEL
Filed June 17, 1924  3 Sheets-Sheet 1

Inventor
Henry O Loebell
Attorney
Edmund G. Borden

Jan. 12, 1932. H. O. LOEBELL 1,840,403
MANUFACTURE OF COMBUSTIBLE GAS AND CARBONIZED FUEL
Filed June 17, 1924 3 Sheets-Sheet 2

Henry O. Loebell Inventor
By His Attorney
Edmund G. Borden

Patented Jan. 12, 1932

1,840,403

UNITED STATES PATENT OFFICE

HENRY O. LOEBELL, OF NEW YORK, N. Y., ASSIGNOR TO HENRY L. DOHERTY, OF NEW YORK, N. Y.

MANUFACTURE OF COMBUSTIBLE GAS AND CARBONIZED FUEL

Application filed June 17, 1924. Serial No. 720,488.

This invention relates to the manufacture of combustible gas and more particularly to an improved method of and apparatus for making high grade fuel gas from a comparatively low heat-value gas by enriching it with hydrocarbon gases.

The gases to be treated in accordance with the present invention are more particularly the low heat-value gases such as blast furnace gas, producer gas and water gas. Blast furnace gas and some kinds of producer gas have such a low heat-value, and contain such a high percentage of non-combustible constituents that for economical combustion they have to be burned while they are hot, and consequently these gases are not suitable for many types of heat treatment processes or for domestic use. Water gas has a comparatively low heat-value and is not suitable for domestic heating purposes unless it is enriched with oil or other hydrocarbon material.

The primary object of the present invention is to provide a method of and apparatus for manufacturing an enriched or comparatively high B. t. u. gas from a gas of low heat-value.

The volatile products of carbonization of coal or other bituminous material have been used in some operations as the enriching medium for increasing the calorific value of a low B. t. u. gas. In these operations a bed of the fuel undergoing carbonization is treated intermittently with a blast of air to maintain the temperature of the fuel bed high enough to support complete carbonization, and between these periods of air blasting the water gas or other low B. t. u. gas is passed through the bed of fuel to complete the carbonization and to carry off with it the volatile components of the fuel. This practice of supplying the heat necessary to complete carbonization by blasting the bed of fuel undergoing carbonization with air results in the loss of part of the fuel due to its combustion by the blast air, and also results in the production of a large volume of lean gas which is practically a waste product in an operation having for its chief object the manufacture of high B. t. u. gas for domestic heating purposes. Moreover a process in which an air blast operation is used is necessarily limited to intermittent operation because the water gas must be passed through the fuel bed between periods of air-blasting in order that the heating-value of the enriched water gas product will not be lowered by the admixture of lean gas products of the air-blasting cycle therewith.

Accordingly another object of the invention is to provide a method of and apparatus for manufacturing an enriched combustible gas by means of which the enrichment of the gas with volatile products of fuel carbonization can be effected without burning any portion of the solid products of carbonization to maintain carbonizing temperatures.

Another object of the invention is to provide a method of and apparatus for manufacturing an enriched combustible gas by means of which a superheated low B. t. u. gas may be enriched either in an intermittent or continuous operation.

With these objects in view one feature of the invention contemplates the use of the low B. t. u. combustible gas which is to be enriched, in a superheated form, as the sole heat transferring medium for carbonizing bituminous fuel.

Water gas is well adapted to act as a heat transferring medium for carbonizing bituminous fuel because it is composed of hydrogen and carbon monoxide, and these gases are not decomposed at high temperatures. Furthermore while the water gas is acting as a carbonizing agent, the volatile hydrocarbon constituents removed from the fuel are taken up by this water gas and act to increase its heat-value.

Where the use of superheated water gas is contemplated as the sole medium for carbonizing bituminous fuel, the gas to be used, which may be generated in an ordinary intermittent generator, is passed through a superheater directly from the generator, and the superheated gas is then passed through a bed of fuel in a carbonizing shell in such a manner that the superheated gas furnishes the heat required for carbonizing the fuel in the carbonizing shell and for removing the volatile products of the fuel.

Another feature of the invention contemplates the provision of additional preheaters in conjunction with the carbonization preheater and with the water gas producer wherein any potential heat remaining in the primary blast gases can be stored and utilized in preheating air for blasting and in generating and superheating steam for use in gas-making.

A further feature of the invention contemplates the control of the amount of heat supplied to the water gas carbonizing medium and a control of the rate at which the superheated water gas current is passed through the fuel bed in the carbonizing shell.

Experience has shown that when air-blasting is resorted to for raising the temperature of a bed of bituminous fuel undergoing carbonization, the increased volumes of gas produced by such air-blasting are realized at the expense of a material reduction of the volumes of coke and of liquid by-products. Furthermore, the heating-value of the final gas product is lowered considerably, the tar oils are at least partially decomposed by being subjected to high temperatures adjacent the blast-zone of the fuel column, and the coke product of carbonization has a weak and broken surface structure, is partly broken down into fines, and has other physical defects which lower its marketable value.

Accordingly, another feature of the present invention is the provision of a method of and apparatus for manufacturing combustible gas of high calorific value by means of which volatile products of the carbonization of bituminous fuel are used as the enriching agent for raising the heat-value of a gas of relatively low B. t. u. and the carbonization and enriching process is completed without burning any of the coke product of carbonization or lowering its marketable value and without at any time subjecting the condensible volatile components of the fuel to temperatures at which they would undergo substantial secondary decomposition.

Another object of the invention is to provide a method of and apparatus for manufacturing enriched combustible gas by means of which the heating value of the gas and the physical and chemical properties of tar oil and coke by-products may be widely varied and accurately controlled.

With these and other objects and features in view the invention comprises the improved method and apparatus for manufacturing enriched combustible gas hereinafter described and particularly defined in the claims.

The various features of the invention are illustrated in the accompanying drawings, in which.

Figure 1:
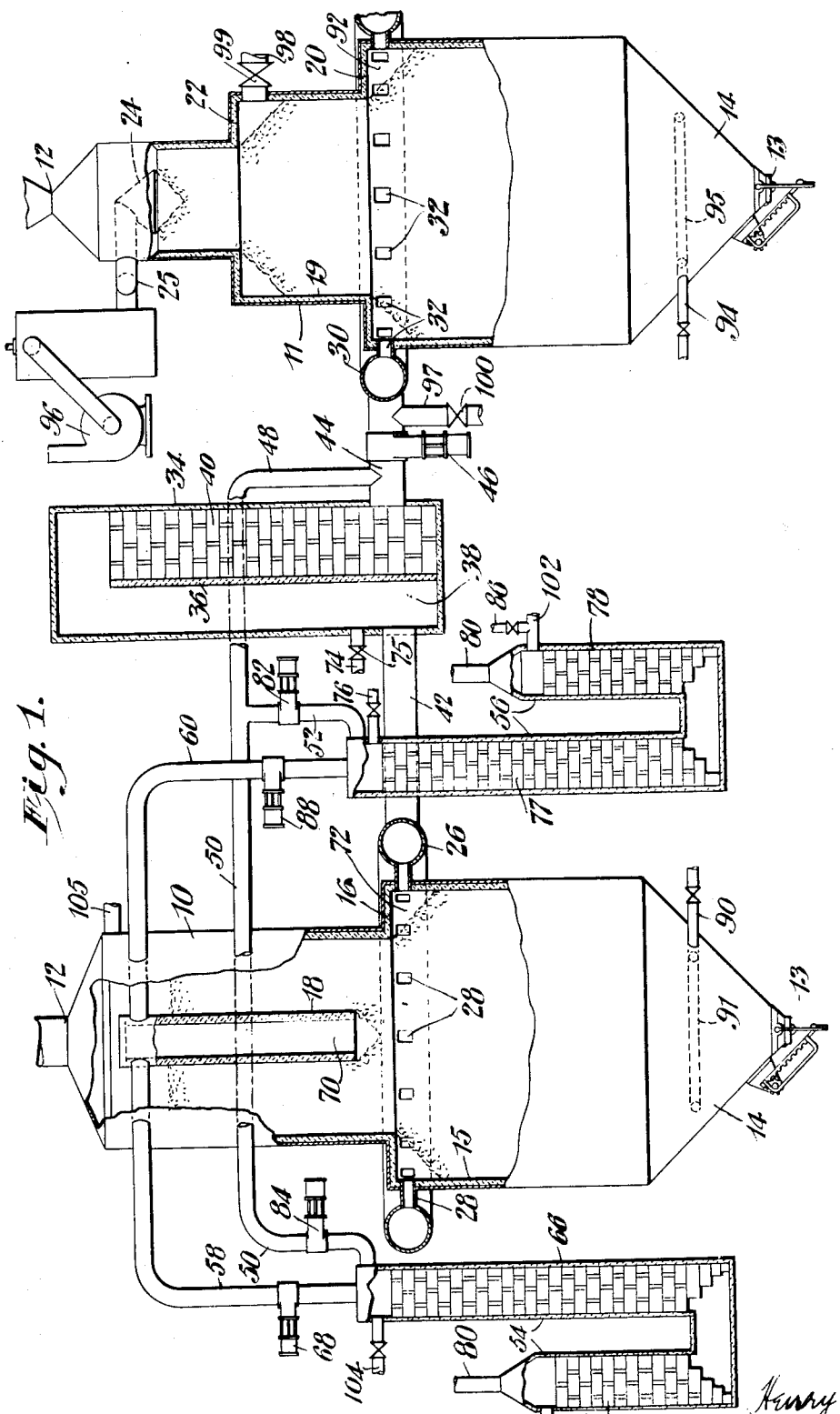
Fig. 1 is a view, in elevation, partly in section, showing one arrangement of a carbonizing shell, water gas generator and carbonization preheater, and their auxiliary regenerator units and connections, embodying the preferred form of the invention.
Figure 2:
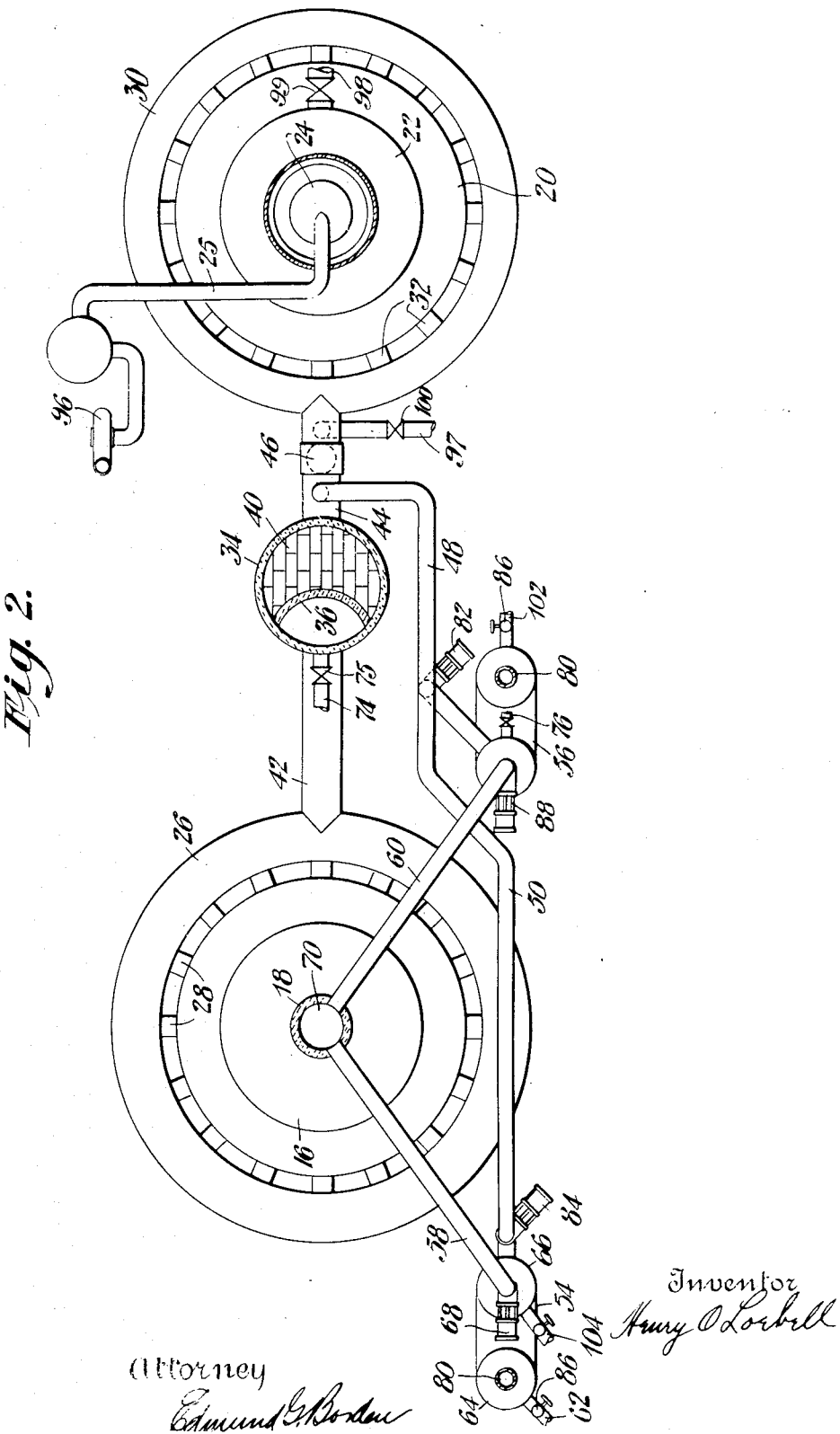
Fig. 2 is a plan view, partly in section, of the same arrangement of apparatus as that illustrated in Fig. 1.

Referring to the drawings, the apparatus arrangement illustrated in Figs. 1 and 2 consists essentially in a water gas generator 10 and a carbonizing shell 11 placed side by side. Both the generator 10 and the carbonizing shell resemble in their general features of design and construction the type of generator known as the "Doherty Shaft". Fuel is introduced into both generator and carbonizing shell through necks 12 at the top of the shaft, and each shaft may be preferably equipped with some kind of mechanical fuel supporting and discharging device (not shown) positioned near its bottom for supporting fuel in a column therein and for advancing it gradually therethrough. Also both units have discharge doors 13 through which ashes and/or coke can be removed from a cooling chamber 14 at the bottom of the shaft. The water gas generator 10 has a refractory lining 15, and the shell and lining are built to form a flat circumferential arch or rack-back 16 around the mid zone of the generator. The generator is divided at the plane of the rack-back into an upper fuel-preheating chamber and a lower enlarged fuel-cooling chamber. A central tube blast nostril 18 is supported axially in the upper fuel-preheating chamber of the generator shaft. The carbonizing shaft has a refractory lining 19, the shell and this lining being built to form a rack-back 20 resembling in form the rack-back 16 in the mid zone of the water gas generator. The carbonizing shell 11 has an upper circumferential arch or rack back 22 vertically spaced a considerable distance above the rack-back 20. Likewise the carbonizing shell has a central gas off-take 24 supported axially at the top of the carbonizing chamber, with an axial opening pointing downwardly in much the same manner as that of the central tube blast inlet 18 in the generator shaft. A foul gas main 25 leads off from this gas offtake. A bustle pipe 26 surrounds the generator 10 at about the plane of the rack-back 16, and a number of offtake nostrils 28 connect this bustle pipe with the interior of the generator, being spaced at regular intervals about its circumference. A similar bustle pipe 30 surrounds the carbonizing shell, and similar inlet nostrils 32 communicate with the interior thereof at regular intervals about its circumference.

A carbonization preheater 34 is placed between the water gas generator and the carbonizing shell. This carbonization preheater has a partition wall 36 dividing its interior into a combustion chamber 38 and a heating chamber 40. A gas main 42 leads from the bustle pipe 26 into the combustion chamber 38. Likewise a gas main 44, equipped with a hot valve 46, leads from the bottom of the heating chamber 40 into the bustle pipe 30. A gas conduit 48 leads off from the conduit 44 between hot valve 46 and heating chamber 40 of the carbonization preheater, and extension lines 50 and 52 lead from conduit 48 to regenerator units 54 and 56, respectively. The two regenerator units 54 and 56 are connected with the top of central tube blast nostril 18 of the generator through conduits 58 and 60, respectively. Both the regenerator units are built in two sections e. g. an auxiliary regenerator chamber and a primary regenerator chamber, each of which is filled with fire brick or other refractory material.

The preferred method of making gas may be carried out in the apparatus shown in Figures 1 and 2 of the drawings as follows:

Fuel is charged through necks 12 into the top of the water gas producer 10 and into the top of the carbonizing shell 11 and is advanced downwardly through both shafts substantially continuously. In starting operations the refractory fillings of both sections of regenerator unit 54 are first heated by burning gases in contact therewith. Primary air is then introduced through an inlet 62 into the top of auxiliary regenerator 64 of the regenerator unit 54, and as this primary air passes downwardly through chamber 64 and upwardly through chamber 66 it is preheated by heat interchange with the refractory filling. From the top of chamber 66 this hot primary air passes through conduit 58 and an open hot valve 68 into the top of the central blast tube 18, and thence flows downwardly through an axial inlet opening 70 into the mid portion of the column of fuel in the gas producer. The air entering the fuel column through opening 70 passes downwardly and outwardly in all directions through the incandescent zone of the fuel bed toward a circumferential opening or passage 72, formed between the generator lining and a truncated cone surface established by the fuel during its expansion on a natural angle of repose to fill the enlarged cooling chamber of the shaft immediately beneath the arch 16. From the circumferential opening 72 the primary blast gases pass through nostrils 28 into bustle pipe 26, and are thence conducted through main 42 into the bottom of combustion chamber 38 of the carbonization preheater. At this point a predetermined amount of secondary air is admitted through pipe 74 and control valve 75, and part of the primary blast gases are burned. Their heat of combustion is caught and stored in the refractory filling of heating chamber 40 as the flames of combustion pass downwardly therethrough. During this blast cycle hot valve 46 is kept closed and the mixture of hot unconsumed primary blast gases and products of combustion leaving chamber 40 passes through conduit 48 and is conducted through extension 52 into the top of regenerator unit 56. At the same time secondary air in sufficient amount to burn the remaining unconsumed primary blast gases is introduced into the top of regenerator unit 56 through a pipe 76, and as the flames of combustion pass downwardly through primary regenerator chamber 77 and upwardly through auxiliary regenerator 78 they are cooled by heat transfer with the refractory linings of both chambers and are exhausted through stack 80 at a comparatively low temperature. During all of this blast cycle, hot valve 82 in the extension line 52 is open, while hot valve 84 in extension 50 is kept closed.

During the subsequent make cycle saturated steam is admitted into the auxiliary chambers of either or both regenerator units through pipes 86, and after passing through the refractory linings of the auxiliary and primary chambers and being superheated by heat transfer therewith the steam is conducted through conduits 58 and 60 into the top of central tube inlet 18, and thence downwardly into the fuel bed through axial opening 70. At the same time steam is admitted into the bottom of the generator through pipe 90 and a distributing coil 91 in the cooling chamber 14. This second supply of steam is introduced by the distributing coil in such proportions as to be distributed evenly throughout all sections of the bottom of the fuel column, and as it rises through the column it serves to quench the fuel while at the same time becoming superheated, so that a major portion of the sensible heat of the fuel is returned to the incandescent zone of the fuel bed, and the additional superheated steam thus provided supplements the supply of steam from the regenerator units 54 and 56 in generating water gas. Most of the water gas produced in the generator during the make cycle passes out of the fuel column through nostrils 28 into bustle pipe 26, and is conducted by main 42 into the bottom of combustion chamber 38 of the carbonization preheater, following the same path as that taken by the primary blast gases during the previous blast cycle. During the make cycle, however, valves 82 and 84 in extensions 52 and 50 are closed and hot valve 46 in main 44 is opened, so that make gases, after being superheated by downward passage through the hot refractory filling of heating chamber 40, are conducted by main 44 into bustle pipe 30 and thence through nostrils 32 and a circumferential opening 92 into the lower portion of the fuel bed in the carbonizing shell. At the same time steam or other heat transferring gas is introduced through an inlet pipe 94 and a distributing coil 95 into the cooling chamber 14 of the carbonizing shell, and as this steam rises through the fuel column it acts to cool the coke product of carbonization and to return a large part of its sensible heat to the upper carbonizing zone, thus supplementing the carbonizing action of the superheated make gases from the producer.

An exhauster 96 in the foul gas main 25 draws the hot current of water gas through the carbonization preheater and the connecting mains into the fuel column, and thence upwardly through the fuel and out through off-take 24. By introducing the hot water gas carbonizing medium peripherally into the lower portion of the fuel column through circumferential passage 92, and then withdrawing it axially through the offtake 24 at the top of the column, the gas is forced to traverse the radial distance between the circumference and the vertical axis of the column of fuel during its upward passage therethrough, and an even distribution and consequent efficient heat transfer is thus secured between the gas and the fuel throughout each cross section of the column. The rate at which the fuel is passed through the carbonizing shaft is regulated by the rate at which it is discharged from the bottom of the column, and the rate at which the exhauster 96 is run will govern the rate at which the hot gas carbonizing medium is passed through the refractory filling of the carbonization preheater and through the fuel bed in the carbonizing shaft. Thus by varying the rate at which the fuel is discharged, and by varying the speed of the exhauster—assuming that the temperature of the carbonizing medium is maintained constant,—the fuel can be carbonized to any degree desired during its passage through the carbonizing shell, and the yield and properties of the gas, coke, and tar oil products of the operation are under almost perfect control. The mixture of superheated water gas, heat transferring gas, and the volatile products of the fuel carbonization effected by passing the hot water gas through the fuel bed, is gradually cooled as it rises toward the axial offtake 24 by heat transfer with cooler portions of freshly charged raw fuel, so that at the time this mixture of gases leaves the fuel bed through offtake 24 it is comparatively cool and is conducted directly to the usual condensing, scrubbing and purifying apparatus.

Valve 75 in the secondary air inlet 74 to the combustion chamber of the carbonization preheater provides the means for controlling the proportions of primary blast gases which are burned therein, and this in turn regulates the amount of heat supplied to and stored in the refractory filling of the heating chamber. Thus by varying the amount of secondary air introduced through pipe 74 the refractory filling in the chamber can be kept at almost any temperature desired, within reasonable limits, and the current of water gas or other combustible gas which is to be used as the carbonizing medium can be given a corresponding degree of superheat before it is admitted to the carbonizing shell. Ordinarily this current of combustible gases will be heated to a temperature well above the temperature required for carbonization, i. e. it will be heated to a temperature at which the temperature differential between it and the fuel to be carbonized will remain high enough so that it will give up enough of its sensible heat by heat transfer to completely carbonize fuel in the upper section of the carbonizing shaft during its passage therethrough. Less heat may be supplied to the gas if desired, however, and it will be obvious that the secondary air valve 75 is another simple control by means of which the yield and qualities of the gas, coke and tar oil products of the process can be varied, as indicated in the preceding paragraph.

The gas main 44 has a secondary air inlet 97 leading into it between hot valve 46 and the bustle pipe 30, and the carbonizing shaft is provided with a supplementary lean gas offtake 98, equipped with valve 99, which opens into the shaft at a point immediately below the upper rack-back 22. In the ordinary course of operation valve 100 in the air inlet 97 and valve 99 in the offtake 98 are kept closed, but if at any time the current of combustible gases entering the fuel column from the carbonization preheater should suddenly drop off in volume or temperature so as not to carry sufficient heat to carbonize all the fuel passing through the carbonizing shell, these valves may be opened for a short period to admit secondary air into the fuel bed in sufficient quantity to raise its temperature and the temperature of the heating gases sufficiently to complete carbonization. During this short period the gases produced may have a calorific value below the standard specifications of the plant, and if this is the case they will be led off through conduit 98 and will either be passed to an auxiliary holder or will be buretted or mixed with a rich coal gas before use. This provision for supplemental air blasting in the carbonizing zone is merely precautionary and is not required except in emergency cases.

During the blast cycle previously described regenerator unit 54 was used for preheating the blast gases and regenerator unit 56 was used for absorbing any potential heat remaining in the waste blast gases after they had passed through the carbonization preheater. Accordingly the temperature of the refractory filling in unit 54 will have been materially reduced before the completion of the make cycle. Therefore during the following blast cycle, after the make steam has been cut off, primary air will be admitted into the top of auxiliary chamber 78 of regenerator unit 56, through a pipe 102, and after passing down through the hot refractory filling of chamber 78, and up through the filling of chamber 77, it will be led through conduit 60 into blast inlet 18 and thence downwardly into the axial portion of the fuel column. The mixture of unburned primary blast gases and products of combustion leaving the carbonization preheater 34 during this blast cycle will be conducted through extension pipe 50 and hot valve 84 into chamber 66 of regenerator unit 54. Secondary air sufficient to secure complete combustion of the unburned primary blast gases will be admitted simultaneously through a pipe 104, and the heat generated by the combustion of these gases will be recovered and utilized in regenerating the heat of the refractory linings in chambers 66 and 64.

A rich gas offtake 105 is provided at the top of the water gas generator to carry off any coal gas which may be evolved from fuel in the annular preheating chamber of the generator during the time that it is undergoing preheating and carbonization in its downward passage therethrough. A minor portion of the water gas and/or of the primary blast gases produced in the gasifying zone of the generator is passed up through the annular column of fuel in this chamber to drive off its volatile components, and the mixture of gas and volatile components evolved from the fuel are removed through offtake 105. This gas mixture may be mixed with the main gas product of the process and conducted through the same condensing, scrubbing and purifying equipment used in treating the rich gas leaving the carbonizing shell; or if it is of relatively low-heating value it may be led to a separate storage holder and used in some nearby industrial operation where a gas of high heating value is not required. When coal is used as the generator fuel the gas withdrawn through offtake 105 will have a high calorific value, but ordinarily coke will be the fuel used in the water gas generator and accordingly only small quantities of gas of relatively low heating value will be removed from the top of the generator.

Figure 3:
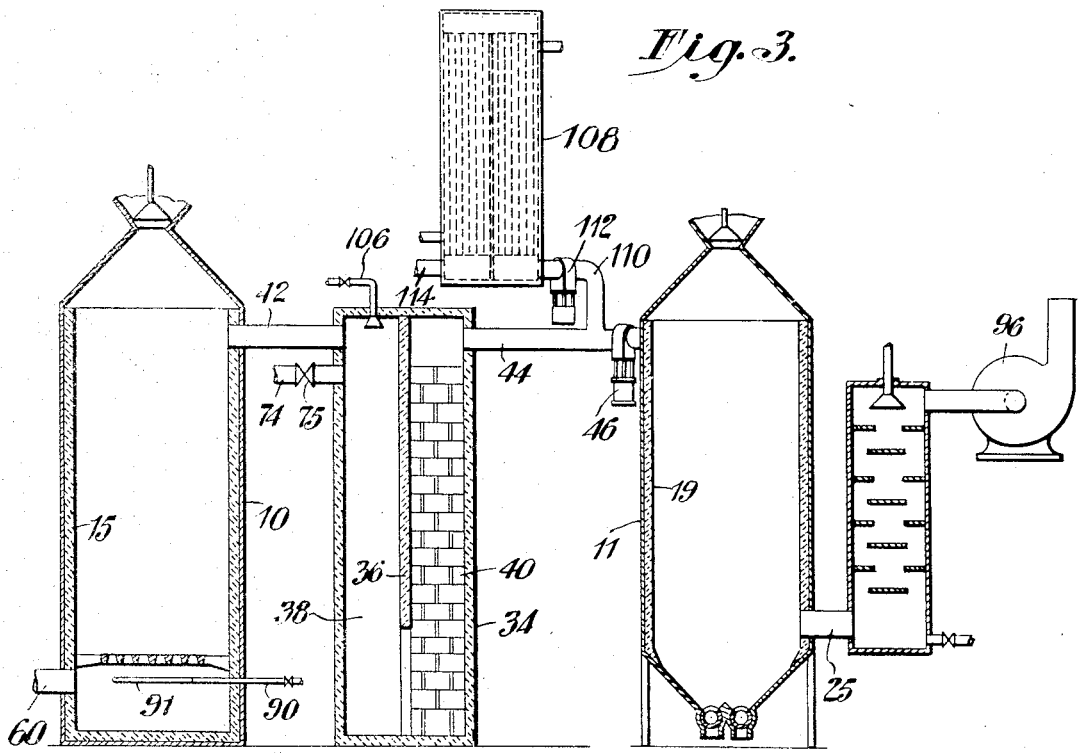
Fig. 3 is a diagrammatic elevation of a simple arrangement of apparatus showing the way in which a standard water gas set can be altered to conform to the apparatus requirements of the invention.

In place of the special type and arrangement of water gas generator and carbonizing shaft illustrated in Figs. 1 and 2 of the drawings and described above, a standard water gas set comprising generator, carburetor and superheater elements may be altered at little expense to conform to the apparatus requirements of the present invention, (see Fig. 3). For this purpose alterations need only be made on the carburetor and superheater elements, since the ordinary waster gas generator may be used without alteration. By installing a refractory partition wall 36 in the carburetor unit of the standard set, and by filling one of the chambers thus formed with refractory, the conversion into a carbonization preheater is substantially complete, the carbonization preheater thus formed having a combustion chamber 38 and a refractory filled preheating chamber 40 (see Fig. 3). Likewise by removing the refractory filling of the superheater element of a standard water gas set and by installing a fuel charging device at top and fuel discharging devices near its base, the superheater is converted into a suitable carbonizing shell. The gas main 42 in the standard water gas set usually leads from the top of the generator into the top of the carburetor unit, so that to use this connection the partition wall 36 in the altered carburetor unit is preferably suspended from the top of the shell. Likewise the gas main 44 connecting the carburetor and superheater elements of the standard set should be shifted so that it will lead from the top of heating chamber 40 of the altered carburetor into the top of the altered superheater element or carbonizing shell. An oil inlet pipe 106 equipped with spray nozzles, such as would be found in the carburetor element of a standard set, is preferably retained in the altered set, but is shifted so that the oil will enter the incoming gas stream in combustion chamber 38 before the gas current is admitted into the refractory lining of heating chamber 40. A waste heat steam boiler 108, having a gas inlet 110 equipped with hot valve 112, and a discharge pipe 114 leading either to auxiliary regenerator units such as those designated as 54 and 56 in the apparatus arrangement illustrated in Figs. 1 and 2, or to other heat exchanging equipment, may be introduced into the circuit as shown in Fig. 3. This waste heat boiler is not an essential part of the apparatus, but may be installed in case the refractory filling of the carbonization preheater and of the auxiliary regenerator units do not extract most of the potential heat of the primary blast gases. By passing the exhaust gases through the tubes of the boiler most of their remaining sensible heat is recovered and utilized in generating steam, and the thermal efficiency of the process is thereby increased.

Using the apparatus arrangement represented by the converted water gas set above described, the operation will be essentially as follows:

An up blast through the fuel in generator 10 (referring to Fig. 3 for purpose of illustration) carries the primary blast gases into the top of chamber 38 of the altered carburetor unit 34, where they are burned with secondary air. The gas is burned down through chamber 38 on one side of the partition wall 36 and up through the refractory lining of chamber 40, and the products of combustion finally leave through the waste heat boiler 108 and after passing through the heating tubes of the boiler may be preferably burned in auxiliary regenerators and exhausted to the atmosphere. During the make cycle, steam is admitted to the bottom of generator 10 and the water gas produced in the incandescent zone of the fuel bed is conducted through carbonization preheater 34, where it absorbs heat from the refractory filling. The superheated water gas is then passed downwardly through a bed of raw fuel in the carbonizing shell 11 (the altered superheater element), carbonizing the charge and driving off the volatile products of the fuel during its downward passage therethrough. When this arrangement of apparatus is used the carbonizing shell 11 is preferably started off with a fuel charge of coal and the operation continues until the entire charge has been reduced to coke. This coke is then withdrawn from the bottom of the carbonizing unit and is used as fuel in generator 10 during a subsequent cycle. In case it is desired to make gas of a higher heating value than would be produced by this method oil may be introduced through pipe 106 at the top of chamber 38 to carburette the water gas, and the hot refractory filling in chamber 40 will serve a double purpose, e. g. in superheating the gas current and in promoting complete vaporization of the oil and decomposition of its hydrocarbons into fixed gases.

Coke is the preferred form of fuel used for charging the generator shaft, although coal or other carbonaceous material may be substituted therefor. The charge of coke is advanced in a column through the furnace at such a rate that it is substantially completely gasified by the alternate blasts of air and steam during its passage through the high temperature blast zone. After being quenched by steam or other inert gas in the lower cooling chamber of the generator, the ash and clinker product of gasification and any unconsumed coke are continuously or periodically removed from the bottom of the shaft to make room for the addition of fresh portions of fuel to the charge. In much the same manner raw coal or other bituminous material, preferably in admixture with a sufficient proportion of coke or other refractory to make an open fuel bed for more ready distribution of heating and cooling gases, is passed continuously in a column through the carbonizing shaft 11 at a rate such that the coal is carbonized by a current of hot combustible gas passing countercurrently through the fuel column.

The process may be conducted with complete gasification of the fuel, but preferably it is carried out with only partial gasification with the object of producing enriched water gas of high calorific value together with good yields of marketable coke and tar-oil by-products. The auxiliary regenerator units and waste heat boilers or other heat exchanging equipment which are used in conjunction with the carbonization preheater and the water gas generator provide the means for recovering a substantial portion of the sensible and latent heat of the primary blast gases, and by utilizing this heat in preheating blast air, in generating and superheating make steam, and particularly in raising the temperature of the make gases, the process will have a high thermal efficiency and an excellent heat balance. As previously described, the rate at which the water gas carbonizing medium is passed through the carbonization preheater and through the fuel bed in the carbonizing shell is controlled by altering the speed of the exhauster unit 96 in the foul gas main 25, and by this control and the means previously described for regulating the degree of superheat imparted to the heating gas current by the refractory filling of the carbonization preheater, the degree to which the fuel in the carbonizing shell is carbonized is under perfect control. Moreover, since the water gas is the sole medium by which heat for effecting the complete or partial carbonization of the fuel in the carbonizing shell is supplied, the quality of the gas, coke and tar oil products of the process may be readily altered and widely varied within a very short space of time. The current of water gas is given a sufficient degree of superheat so that no air blasting of the fuel bed in the carbonizing bed is necessary, and the coke product of the carbonization is consequently possessed of a dense and uniform surface structure, carries a very small proportion of fines, and resembles good metallurgical coke in practically all of its properties. Likewise the liquid tar oil by-products produced in the carbonizing shell by this method do not carry the proportions of secondary products of thermal decomposition generally contained in tar oils produced in a generator in which carbonization is assisted by air blasting, but are essentially primary in nature. The yield of these tar oils is greatly increased by this method of carbonization, and because of the fact that they are not exposed to high temperatures either at the point at which they are first liberated or at any other period thereafter, but are removed through cooler and cooler sections of the fuel without being at any time exposed to temperatures at which they would undergo a secondary decomposition, it is believed that their quality as primary tar oils is unsurpassed by any tar oils now produced.

One of the main features of the invention is the method of conducting a process so as to secure maximum utilization of the heat generated in the various aparatus units. Thus the heat carried out of the high temperature zone by the ash and fuel residues of gasification in the generator is transferred to the countercurrent circuit of steam and is used in superheating the steam, being returned thereby for further work in gasifying raw fuel in the generating zone. In much the same way, the heat carried out of the carbonizing zone by coke in the carbonizing shell is returned by a countercurrent flow of steam or other heat transferring gas. The sensible heat of the heating gas circuit and of coal gas evolved in the carbonizing zone is transferred to fuel passed countercurrently therewith, and is thus returned to the carbonizing zone, while the heat removed from the generator in the form of latent and sensible heat in the primary blast gases is substantially all recovered and utilized in preheating air, in generating and superheating steam and in preheating the make gases, as previously described.

It is apparent that by carefully regulating the rate at which the preheated water gas carbonizing medium is allowed to pass through the carbonizing shell, and by imparting to this water gas a sufficient degree of superheat so that it will completely carbonize the fuel as it passes through the upper zones of the carbonizing shell, the gas finally leaving the top of the shell will possess a comparatively high illuminating value and may be substituted for ordinary coal gas in most of the uses to which such gas is put. When water gas is used as the carbonizing medium and when bituminous coal of 30% volatile or upwards is used as fuel, the process is capable of producing gas of uniformly high calorific value, approximating 400 B. t. u. per cubic foot, and in addition will produce twenty to thirty-five gallons of high grade primary tar oils and upwards of one thousand pounds of high grade industrial metallurgical coke per ton of fuel treated.

While the process is directed primarily to the production of gas of high calorific value and consequently bituminous coal is the preferred fuel, still it need not be limited to the use of such fuel and is equally well adapted to the treatment of anthracite coal, lignite and oil shales.

It is not essential to the method described that water gas be used as the carbonizing medium. Any other type of combustible gas, such as producer gas or blast furnace gas may be used, but of course these latter gases, since they carry a large proportion of inerts will not produce a final product of such high calorific value as that produced when water gas is used as the fuel distilling medium. If producer gas is used as the carbonizing medium the generator 10 will be operated as a gas producer.

Figure 4:
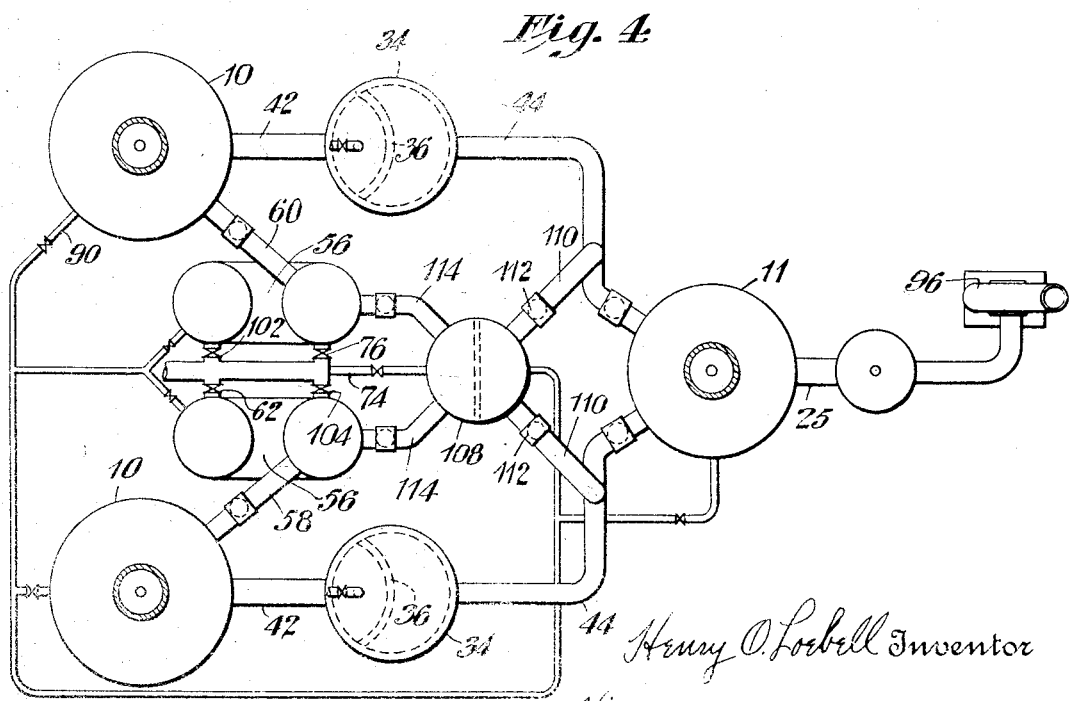
Fig. 4 is a plan view of another arrangement of apparatus comprising a plurality of elements similar to those shown in Fig. 1 and Fig. 3, and suitable for carrying out the invention with continuous operation.

While the apparatus shown in Figs. 1, 2 and 3 of the drawings comprises a single water gas generator, a single carbonization preheater and a single carbonizing shell, it is plain that by using two or more water gas generators and two or more carbonization preheaters as illustrated in Fig. 4 the carbonizing and gas-enriching operation may be conducted continuously. With such continuous operation the water gas producers operate alternately, so that while one is running on a make cycle and the water gas thus produced is passing through one carbonization preheater into the fuel bed of the carbonizing shell, the fuel bed in the other generator is under process of regeneration with air blasting and the primary gases thus produced are burned to heat the refractory fillings of the spare carbonization preheater and the regenerator units. Subsequently the last-named producer and carbonization preheater are operated on a make cycle and the producer and carbonization preheater previously used for generating and superheating water gas, respectively, are operated on a blast cycle.

The term "carbonization preheater" has been used in the specification and claims to define the principal preheating element of the apparatus of the present invention which is used to effect preliminary superheating of the water gas or other heat transferring fluid, which gas is thereafter passed in heat transferring relationship through a body of fuel in a carbonizing chamber to effect carbonization of such fuel. Accordingly it is to be understood that the term "carbonization preheater" as it is used in the specification and claims is intended as a generic term to define specific preheating apparatus designed for use in superheating fluids which are then passed in heat transferring relationship with a body of bituminous fuel for the purpose of carbonizing said fuel.

The term "solid bituminous fuel" and similar expressions in the case are intended to designate bituminous and semi-bituminous coals, peat, brown coal and the like, either in their natural state or after partial or complete carbonization; while the term "solid carbonaceous material" is intended to include such solid bituminous fuels and also anthracite coal, coke and other similar natural and carbonized materials.

The preferred form of the invention having been thus described, what is claimed as new is:

1. A method of producing high grade combustible gas and carbonized fuel comprising treating a body of solid carbonaceous fuel alternately with air and with steam so as to generate blow gas and water gas respectively, recovering and storing the latent and sensible heat of the blow gas and utilizing part of said heat in superheating water gas produced during the steam-run, carbonizing another body of bituminous fuel and driving off its volatile components solely by passing such superheated water gas therethrough, separately removing and collecting the volatile and solid carbonized fuel products of the carbonization of said bituminous fuel body without exposing them to temperatures substantially in excess of those at which they are formed, and recovering a substantial part of the sensible heat of the volatile and solid carbonized fuel products of said carbonization before their removal.

2. A method of producing high grade combustible gas and carbonized fuel which comprises continuously passing a fuel mixture of coal and coke downwardly in a column through a shaft furnace, controlling the rate at which such coal is advanced so that it is carbonized during its passage solely by a direct heat transfer with a stream of superheated water gas, and contacting the gaseous and solid carbonized fuel products of the carbonization with bodies of fresh solid fuel and of cooling non-combustion supporting gas, respectively, to cool said products and return a substantial part of their sensible heat to the carbonizing zone of the fuel column.

3. A method of producing high grade combustible gas and carbonized fuel which comprises introducing combustion-supporting gas and steam alternately into the mid portion of a body of solid carbonaceous fuel to successively generate blow gases and water gas, heating a body of refractory material by burning the blow gases in contact therewith, subsequently superheating the water gas by passing it in heat transferring relationship with the hot refractory material, passing the superheated water gas through the upper portion of another body of solid bituminous fuel to carbonize said material and drive off its volatile components, and passing a heat transferring gas counter-currently through the lower portion of each of the fuel bodies to quench the fuel therein and return its heat to the upper portion of the column.

4. A method of producing high grade combustible gas and carbonized fuel which consists in carbonizing a body of solid bituminous fuel advancing through a shaft generator solely by heat carried by a stream of superheated water gas, simultaneously generating said water gas by forcing steam through the incandescent zone of a body of solid carbonaceous fuel advancing through a second shaft generator, superheating the water gas produced before introducing it into the carbonizing shaft, intermittently elevating the temperature of the bed of fuel in the water gas generator by blasting air therethrough, burning the primary blast gases and utilizing the heat of combustion of the primary blast gases in generating steam, preheating blast air, and in superheating water gas produced during the steam run.

5. A method of producing high grade combustible gas and carbonized fuel which comprises treating a body of solid carbonaceous fuel alternately with air and steam to successively make blow gases and water gas from said fuel, recovering the latent and sensible heat of the blow gases in preheaters and utilizing said heat in preheating blast air, in generating and superheating steam, and in superheating water gas made during the steam run, passing said superheated water gas through a body of coke and coal advancing through a carbonizing shaft to carbonize the coal by heat transfer therewith, and quenching the carbonized fuel before its removal from the carbonizing shaft by passing a heat transferring gas countercurrently therethrough.

6. A method of producing high grade combustible gas and carbonized fuel which comprises continuously passing a fuel mixture of coal and coke downwardly in a column through a shaft furnace, carbonizing the coal in the upper portion of the column by introducing a superheated combustible gas circumferentially into the mid portion of the column and passing it upwardly in direct heat transferring relationship with the fuel, quenching the coke product of carbonization in the lower portion of the column by introducing a comparatively cool heat transferring gas into the bottom of the column and passing it upwardly through the fuel, periodically removing cooled coke from the bottom of said furnace, gasifying coke in a separate shaft generator, superheating the combustible gases produced in the gasification and using the superheated combustible gas to carbonize fresh portions of the fuel mixture.

7. An apparatus for making combustible gas and carbonized fuel comprising a carbonizing shell having an axial gas offtake near its top and a circumferential gas inlet near its mid portion, a gas generator having a peripheral gas offtake, and a carbonization preheater having its interior divided into a combustion chamber and a refractory filled heating chamber, means for introducing secondary air into the combustion chamber of the carbonization preheater to burn gas to heat said refractory filling, means for conducting combustible gas produced in the generator in heat transferring relationship with the hot refractory filling of the carbonization preheater to superheat said gas, and means for passing said superheated combustible gas into the circumferential gas inlet, upwardly through a column of fuel advancing through the carbonizing shell, and out through the axial gas offtake.

8. An apparatus for making combustible gas and carbonized fuel which comprises a water gas generator, a carbonization preheater having a combustion chamber and a heating chamber, and a carbonizing shaft connected in series, means for introducing blast air and steam into a bed of incandescent fuel in the water gas generator, means for introducing secondary air into the combustion chamber of the carbonization preheater to burn primary blast gas made in the generator during the blow, a refractory filling in the heating chamber of said carbonization preheater arranged to catch and store heat of combustion of the blow gases and transfer it to water gas made in the generator during the steam run to superheat said gas, means for passing such superheated water gas into and through a column of bituminous material supported in the carbonizing shaft to carbonize the bituminous material and carry off its volatile components and means for discharging the carbonized fuel from said carbonizing shaft.

9. An apparatus for making combustible gas and carbonized fuel which comprises a carbonizing shaft having a rich gas offtake supported axially at its top, a peripheral heating gas inlet in its mid portion, and a cooling gas inlet near its base, a carbonization preheater having its interior divided into a combustion chamber and a refractory filled heating chamber, a gas generator having an axially supported blast nostril and a peripheral gas offtake, an inlet for secondary air in the combustion chamber of the carbonization preheater for burning gases to heat the refractory filling of the heating chamber, and means for passing gas produced in the generator and superheated by heat transfer with the refractory filling of the carbonization preheater through the peripheral gas inlet and thence upwardly through a bed of fuel supported in the carbonizing shaft and out through the rich gas offtake.

10. An apparatus for making combustible gas and carbonized fuel which comprises a gas producer, a carbonization preheater and a carbonizing shell, a number of heat exchangers having refractory filling, air and steam connections between each heat exchanger and and the gas producer, exhaust gas connections between the carbonization preheater and each heat exchanger, a refractory filling in the carbonization preheater arranged to store heat and to transfer it to combustible gas made in said gas producer, a gas inlet in the carbonizing shell arranged to introduce superheated combustible gas from the carbonization preheater around the periphery of the lower portion of a column of fuel supported therein, and a gas offtake at the top of the carbonizing shell arranged to remove the combustible gas and volatile products distilled from the fuel by heat transfer therewith axially from the top portion of the fuel column.

11. An apparatus for making combustible gas and carbonized fuel comprising a gas generator, a body of refractory material arranged to impart superheat to combustible gas made in said generator, means for burning gas in contact with said refractory material to impart heat thereto, means for passing combustible gas thus superheated through a separate body of fuel to carbonize the fuel and enrich the gas with its volatile components, means for regenerating sensible heat of the carbonized fuel, means for regulating the amount of heat imparted to the combustible gas carbonizing medium, and means for controlling the rate at which the mixture of combustible gas and volatile components of the fuel are passed through and removed from said separate fuel body.

12. An apparatus for making combustible gas and carbonized fuel which comprising a generator, a combined carburetor and superheater element, carbonizing shaft, a partition wall dividing the carburetor and superheater element into a combustion chamber and a heating chamber, a fuel charging device and a fuel discharging device positioned in the top and bottom of the carbonizing shaft, respectively, a refractory filling in the heating chamber of the carburetor and superheater element, an air inlet in the combustion chamber of the carburetor and superheater element having a valve for introducing air in regulated amount to burn gases to heat the refractory filling of the heating chamber, means for recovering and utilizing substantially all the latent and sensible heat of said gases not caught by said refractory filling, and means for passing water gas made in the generator through the said refractory filling to be superheated and thence through a bed of fuel supported in the carbonizing shaft to carbonize the fuel and carry off its volatile components.

13. An apparatus for making combustible gas and carbonized fuel comprising a carbonizing shell, a plurality of gas producers and a plurality of carbonization preheaters, means dividing each of the carbonization preheaters into a combustion chamber and a refractory filled heating chamber, means for burning gas in each of the carbonization preheaters to heat their refractory fillings, means for conducting gas generated in said producers through the hot refractory fillings of the carbonization preheaters to superheat said gas, means for passing said superheated combustible gas through a bed of bituminous fuel in the carbonizing shell to carbonize the fuel and enrich the gas with its volatile components, means for controlling the degree of superheat imparted to the carbonizing medium, and means for controlling the rate at which the superheated gas is passed through the bed of fuel in the carbonizing shell.

14. A method of producing high grade combustible gas and carbonized fuel which comprises air-blasting a bed of solid carbonaceous fuel in a gas generator to incandescence, passing the blast gases into a regenerator and burning them therein and thereby heating the regenerator, shutting off the air blast and then admitting steam to the incandescent zone of the fuel, causing the resultant water gas to pass through the regenerator and thereby superheating the water gas, passing the superheated water gas into the mid-part of a carbonizing shell containing a column of solid bituminous fuel, passing the water gas through the fuel in the carbonizing shell and thereby distilling the volatiles from the fuel, withdrawing the resulting mixed water gas and coal gas from the top of the carbonizing shell, quenching with a non-combustion supporting fluid the solid carbonized fuel product of carbonization, thereafter passing the said fluid through the column of fuel being carbonized and discharging such solid product from the base of the carbonizing shell.

15. A coke and gas making apparatus comprising a regenerator element, a water gas generator connected with said element, means for introducing preheated primary air into the mid part of the generator, means for introducing superheated steam into such generator part, a secondary air inlet for said regenerator element, a carbonizing chamber separate from said generator and said element but communicating with both of same, means for setting up a flow of water gas from said generator through said element and carbonizing chamber, and separate coke quenching means and discharging means in the lower part of said carbonizing chamber.

16. The method of producing high grade combustible gas and carbonized fuel which comprises generating water gas and blow gases alternately in a gasification chamber, burning the blow gases and storing their heat of combustion in preheaters during the blast cycle, passing the water gas through one of the hot preheaters during the steam run to superheat the said water gas, passing the thus superheated water gas in direct heat exchange relationship with a downwardly moving column of raw bituminous fuel and coke in a carbonizing shaft, thereby carbonizing the fuel solely by heat transfer therewith, passing a countercurrent stream of a fluid quenching medium through the moving column of carbonized fuel thereby quenching the latter, and returning sensible heat therefrom directly to the carbonizing zone of the fuel column, and discharging unburned carbonized fuel from the base of the shaft.

17. The method of producing high grade combustible gas and carbonized fuel which comprises intermittently subjecting an incandescent mass of solid carbonaceous fuel to the action of steam, thereby generating water gas, superheating the water gas and subjecting another body of solid bituminous fuel to the distilling action of said superheated water gas thereby carbonizing the bituminous fuel and driving off its volatile components, removing the mixture of water gas and volatile components of the carbonized bituminous fuel from the latter fuel body at a relatively low temperature, regulating the temperature of the superheated water gas and controlling the velocity with which it is passed through the second fuel body, thereby carbonizing the fuel therein to a predetermined degree, passing through the thus-carbonized fuel body a stream of a fluid quenching medium thereby cooling and quenching the carbonized fuel, returning to the carbonizing zone of the fuel column the sensible heat removed from the carbonized fuel by the quenching medium, and recovering the quenched carbonized fuel.

18. The method of producing high grade combustible gas and carbonized fuel which comprises generating combustible gases continuously in a plurality of shaft generators; burning a selected portion of the gases produced in such generators and storing their heat of combustion, utilizing the heat thus stored in preheating air, in generating steam, and in superheating the remaining portion of the gases generated, and passing a continuous stream of the superheated gases through a column of solid carbonizable fuel advancing continuously through a carbonizing shaft thereby carbonizing the fuel, enriching the gases with the volatile products of the fuel being carbonized, cooling and quenching the carbonized fuel by direct heat exchange with a quenching fluid flowing in a non-combustion supporting atmosphere, recovering the thus-quenched carbonized fuel, and transferring to the solid fuel to be carbonized the heat transferred to the quenching medium by the carbonized fuel.

In testimony whereof I affix my signature.

HENRY O. LOEBELL.